United States Patent
Sinnhuber et al.

(12) 
(10) Patent No.: US 6,443,486 B1
(45) Date of Patent: Sep. 3, 2002

(54) OCCUPANT PROTECTION DEVICE WITH A STEERING WHEEL AIRBAG FOR A MOTOR VEHICLE

(75) Inventors: Ruprecht Sinnhuber, Gifhorn; Thomas Wohllebe, Braunschweig, both of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/940,090

(22) Filed: Aug. 27, 2001

Related U.S. Application Data

(63) Continuation of application No. PCT/EP00/00500, filed on Jan. 24, 2000.

(30) Foreign Application Priority Data

Feb. 25, 1999 (DE) .......................................... 198 08 135

(51) Int. Cl.[7] .......................... B60R 21/20; B60R 21/22
(52) U.S. Cl. ..................................... 280/731; 280/728.3
(58) Field of Search .......................... 280/728.2, 728.3, 280/731, 732

(56) References Cited

U.S. PATENT DOCUMENTS

| | | | |
|---|---|---|---|
| 4,968,057 A | * 11/1990 | Rafferty | ...................... 280/731 |
| 5,125,682 A | 6/1992 | Hensler et al. | |
| 5,842,717 A | * 12/1998 | Wohllebe et al. | ........ 280/728.3 |
| 6,161,864 A | * 12/2000 | Heilig | ..................... 280/728.2 |

FOREIGN PATENT DOCUMENTS

| | | |
|---|---|---|
| DE | 42 17 177 A1 | 11/1993 |
| DE | 195 30 346 A1 | 2/1996 |
| DE | 297 10 745 U1 | 11/1997 |
| EP | 0 415 362 A2 | 3/1991 |
| JP | 05 338 513 | 12/1993 |

* cited by examiner

*Primary Examiner*—Peter C. English
*Assistant Examiner*—Ruth Ilan
(74) *Attorney, Agent, or Firm*—Laurence A. Greenberg; Werner H. Stemer; Ralph E. Locher

(57) ABSTRACT

An occupant protection device for a motor vehicle includes an airbag configuration disposed in a hub of a steering wheel. A cover formed of two airbag flaps covers an airbag outlet opening. At least two connecting straps and/or pivoting levers hold each of the two airbag flaps when the steering wheel airbag deploys. At least one of the two airbag flaps radially pivots into a release position when the steering wheel airbag deploys and guides the steering wheel airbag into a given deployment direction.

15 Claims, 2 Drawing Sheets

OCCUPANT PROTECTION DEVICE WITH A STEERING WHEEL AIRBAG FOR A MOTOR VEHICLE

CROSS-REFERENCE TO RELATED APPLICATION

This application is a continuation of copending International Application No. PCT/EP00/00500, filed Jan. 24, 2000, which designated the United States.

BACKGROUND OF THE INVENTION

FIELD OF THE INVENTION

The invention relates to an occupant protection device having a steering wheel airbag for a motor vehicle.

An occupant protection device having a steering wheel airbag for a motor vehicle generally includes an airbag module. The airbag module has at least one gas generator and at least one steering wheel airbag connected thereto. The airbag module is accommodated in a steering wheel hub of the steering wheel. An airbag outlet opening for the deploying airbag is provided in the hub region of the steering wheel and, in the event of a crash, the airbag at least partially emerges through this outlet opening and can be inflated in front of the steering wheel. In addition, a cover is provided which, in a closed position, i.e. covering position, when the airbag is not activated, is positioned in the hub region such that it covers the airbag outlet opening and such that it is secured in place. More specifically, the cover is configured as an airbag flap. An edge of the airbag flap is hingedly connected at the outlet opening and, in the event of a crash, can be moved by the inflating airbag into a release position in order to release the airbag outlet opening.

Despite the fact that the airbag flap, when in the release position, remains connected to the hub region of the steering wheel and therefore cannot be hurled in an uncontrolled manner into the vehicle interior when the airbag is activated, there is nevertheless the possibility that the airbag flap, when moving to the release position or when protruding toward the driver, may interfere with the driver and exhibit a so-called "aggressiveness." This aggressive behavior of the airbag flap may in particular be a problem if the driver is sitting too close to the steering wheel. The aggressive behavior of the airbag flap may also be a problem when, during a crash impact, the volume of the airbag is reduced and the driver comes into contact with the protruding airbag flap.

Furthermore, conventional occupant protection devices are configured such that the steering wheel airbag, when being filled and unfolded, deploys in a direction toward the driver without being guided in any way. As a result, the airbag exhibits a level of aggressiveness that, in particular when the airbag is inflated rapidly, may harm the driver. Published, Non-Prosecuted German Patent Application No. DE 42 17 177 A1, discloses an occupant protection device of the type described above. The occupant protection device includes an airbag configuration with at least one steering wheel airbag, which is folded up in the normal state, and at least one associated gas generator. Furthermore, an airbag outlet opening is provided for the deploying airbag. The outlet opening is covered with a cover which is formed of two relatively rigid airbag flaps. The airbag flaps can be moved from a covering position, in which the airbag flaps are secured by a holding device, into a release position for releasing the airbag outlet opening to let out the airbag. The two airbag flaps are each connected to the edge region of the airbag outlet opening by two spaced apart pivoting levers in such a manner that, in the release position, the airbag flaps clear the airbag outlet opening.

The positioning and the length of the pivoting levers connected to the airbag flaps are identical for both airbag flaps. This results in identical kinematic properties for both airbag flaps so that, during the opening movement, both airbag flaps perform an essentially translatory movement close to the plane defined by the opening of the housing. In the release position, the airbag flaps are shifted completely away from the airbag outlet opening, with the result that they cannot come into contact with the deploying and inflating airbag. A structure of this type is used with the intention of avoiding that the opened airbag flaps point with a free edge in the direction of the vehicle occupant. A radial pivoting of the airbag flaps is neither performed nor desired. In addition, the airbag is inflated without any device for guiding the airbag.

Furthermore, U.S. Pat. No. 5,125,682 discloses an occupant protection device having a steering wheel airbag for a motor vehicle. When the occupant protection device is activated, a cover, which caps an airbag outlet opening, is raised completely from the hub region. The cover is then held back by two straps of identical length and the airbag is inflated around the raised cover which is held at a given distance from the hub.

Furthermore, German Utility Model No. DE 297 10 745 U1, Published, Non-Prosecuted German Patent Application No. DE 195 30 346 A1, European Patent Application No. EP 0 415 362 A2 and Patent Abstracts of Japan for Japanese Patent Application No. JP 05338513 A each disclose structures having flaps or covers which are retained via conventional catch straps. A disadvantage of these structures is, as can be seen for example in European Patent Application No. EP 0 415 362 A2, the fact that the catch straps are connected at the edge of each airbag flap and are in each case at the same distance from the border region of the two airbag flaps, with the result that the airbag flaps pivot over their full length into the interior of the vehicle. As a result there is the risk of harm being caused to the vehicle occupants. Here too, the airbag is deployed and filled without any kind of guiding.

SUMMARY OF THE INVENTION

It is accordingly an object of the invention to provide an occupant protection device which overcomes the above-mentioned disadvantages of the heretofore-known occupant protection devices of this general type and with which an airbag deployment from a hub region can be performed such that the airbag can be guided in a simple manner and such that the risk of harming a driver with the opening airbag flaps is reduced.

With the foregoing and other objects in view there is provided, in accordance with the invention, an occupant protection device for a motor vehicle, including:

an airbag configuration including at least one steering wheel airbag and at least one gas generator assigned to the at least one steering wheel airbag, the at least one steering wheel airbag being folded up when in a normal state and unfolding when in a deploying state, the airbag configuration defining a steering wheel hub region and a hub axis and being formed with an airbag outlet opening in the steering wheel hub region, the airbag outlet opening having a peripheral region;

a cover including two airbag flaps for covering the airbag outlet opening, the two airbag flaps being substantially rigid and being held in place when in a covering position, the two airbag flaps being movable from the covering position to a release position for uncovering the airbag outlet opening and for letting out the at least one steering wheel airbag;

at least two links assigned to each one of the two airbag flaps, the at least two links being selected from the group consisting of connecting straps and pivoting levers, the at least two links having respective flap-side fastening locations and respective hub-side fastening locations, the flap-side fastening locations being disposed at a respective one of the two airbag flaps, the hub-side fastening locations being disposed at the peripheral region of the airbag outlet opening, a first one of the flap-side fastening locations being closer to the hub axis than a further one of the flap-side fastening locations; and at least one of the two airbag flaps being a radially pivotable airbag flap, the at least two links for the radially pivotable airbag flap having respective structural properties selected from the group consisting of respective link lengths, respective hub-side fastening locations and respective flap-side fastening locations configured such that the radially pivotable airbag flap is substantially radially pivotable from the covering position to the release position and such that the radially pivotable airbag flap guides the at least one steering wheel airbag into a given deployment direction.

In other words, according to the invention, an occupant protection device having a steering wheel airbag for a motor vehicle includes an airbag configuration which has at least one steering wheel airbag, which is folded up in the normal state, and which has at least one associated gas generator. An airbag outlet opening for the deploying airbag is formed in the hub region of the steering wheel. Furthermore, a cover for the airbag outlet opening is provided, the cover being formed of two relatively firm or rigid airbag flaps which can be moved from a covering position, which is secured for example by a retaining device, into a release position for releasing the airbag outlet opening to let the airbag out. Furthermore, at least two connecting straps and/or pivoting levers assigned to each airbag flap are provided and are connected on one side in respective hub-side fastening locations on the edge region or peripheral region of the airbag outlet opening and on the other side in respective flap-side fastening locations on the assigned airbag flap, in which case on each airbag flap a first, flap-side fastening location lies closer to the hub axis than at least one further flap-side fastening location. The positioning and/or the length of the connecting straps and/or pivoting levers on at least one of the airbag flaps is selected to differ in such a manner that this at least one airbag flap can be pivoted approximately radially during the transfer into the release position and, in the release position, can be aligned or oriented in such a manner that it serves as a guide for a specific outlet direction of the airbag.

A targeted airbag deployment with a specific airbag orientation, in particular toward the driver's chest, is advantageously possible with a structure of the above-described type, in which at least one airbag flap which can be pivoted approximately radially in the release position can be aligned or oriented in such a manner that the airbag flap can serve as a guide by, for example, partially protruding into the deployment region of the airbag. In this case, due to the airbag flap being fastened with at least two connecting straps and/or pivoting levers, it is ensured that the airbag flap can be readily held in its radially pivoted position so as to provide a secure guidance for the airbag during inflation, since the airbag flap cannot swing away in an undefined manner. By guiding the airbag during its deployment in a targeted manner, the protection function of the airbag as a whole can be increased and its aggressiveness toward the driver can be reduced. In this case, due to the fastening location or connecting point which lies closer to the hub axis, in conjunction with the at least one further fastening location, an additional, advantageous effect is achieved in that the airbag flaps are not pivoted over their entire length into the interior of the vehicle, as was the case with the airbag flap that is connected merely at an edge thereof. Rather, the release movement takes place relatively close to the region of the airbag outlet opening, with the result that the radially pivoted flap is disposed, just like before the pivoting, in the steering wheel region. Although edges of the radially pivoted airbag flaps protrude in the direction of the vehicle interior, there is no risk of the driver coming to harm as a result of the (only slightly) protruding edges of the airbag flaps, due to the fastening and opening of the airbag flaps according to the invention in the region close to the outlet opening.

According to another feature of the invention, one of the two airbag flaps is the radially pivotable airbag flap, a further one of the two airbag flaps is a linearly displaceable airbag flap, and the at least two links for the linearly displaceable airbag flap have respective link lengths and/or respective hub-side fastening locations and/or respective flap-side fastening locations configured such that the linearly displaceable airbag flap is substantially linearly displaceable from the covering position to the release position and such that the linearly displaceable airbag flap is disposed in a plane substantially perpendicular to the hub axis and guides the at least one steering wheel airbag into a given deployment direction.

According to yet another feature of the invention, both of the two airbag flaps are radially pivotable airbag flaps having substantially identical kinematic properties and being substantially radially pivotable from the covering position to the release position.

The connecting straps can be produced, for example, from various tear-resistant materials, in particular from plastic or from metal wire. The pivoting levers can be produced, for example, from plastic or metal.

In addition, the connecting straps can advantageously also be used as catching straps or tethers, which prevent the at least one airbag flap from being hurled in an uncontrolled manner into the passenger compartment.

In a preferred embodiment of the invention having particularly preferred kinematical properties during the opening, the fastening locations of the connecting straps on the airbag flap are disposed closer to the hub axis than the fastening locations on the airbag outlet opening. This forces, when the airbag deploys, the airbag flap to open in a particularly advantageous manner such that the opening airbag flap is provided substantially radially in the hub transverse plane and pushes outward. The opening of the airbag flap can optionally be combined with a swing-open movement, if the connecting straps are appropriately configured.

In order to achieve a rapid opening of the airbag flap with the desired kinematical properties, the opening process initiated by the airbag can additionally also be assisted by a spring force, which may be generated by a resilient structure. For this purpose, corresponding springs can be provided.

Expediently, when the airbag is not activated, the airbag flaps are secured in their covering position through the use of a preformed notch which can be torn open by the deployment of the airbag and/or through the use of a form-fitting and/or clamping structure as a securing structure. In a specific, preferred embodiment, two semicircular airbag flaps are provided which are connected in the covering position at a preformed, grooved tear-open notch to form a circular cover for the hub region. The tear-open notch extends along a diameter line of the circular cover. A configuration of this type, which includes two semicircular airbag flaps, results in favorable opening kinematics with a reduced aggressiveness and the possibility of guiding the airbag deployment in a suitable manner.

It may be expedient, depending on the individual circumstances of the vehicle, to provide a tear-open notch of this type vertically or horizontally when the steering wheel is in a centered position, i.e. the steering wheel is not turned.

Depending on given requirements and depending on desired airbag flap kinematics, three or more connecting straps may be used in each case for one airbag flap.

In an advantageously compact configuration, an airbag and a gas generator are combined in an airbag module which is fitted in the hub region of the steering wheel. In the case of a configuration of this type, the connecting straps can advantageously also be connected directly to the edge region of the airbag module.

With the objects of the invention in view there is also provided, in combination with a steering wheel having a hub region, an occupant protection device for a motor vehicle, including:

an airbag configuration including a steering wheel airbag and a gas generator assigned to the steering wheel airbag, the steering wheel airbag being folded up when in a normal state and unfolding when in a deploying state, the airbag configuration being formed with an airbag outlet opening in the hub region, the airbag outlet opening having a peripheral region;

a cover including two airbag flaps for covering the airbag outlet opening, the two airbag flaps being substantially rigid and being held in place when in a covering position, the two airbag flaps being movable from the covering position to a release position for uncovering the airbag outlet opening and for letting out the steering wheel airbag;

at least two links assigned to each one of the two airbag flaps, the at least two links being connecting straps and/or pivoting levers, the at least two links having respective flap-side fastening locations and respective hub-side fastening locations, the flap-side fastening locations being disposed at a respective one of the two airbag flaps, the hub-side fastening locations being disposed at the peripheral region of the airbag outlet opening, the hub region defining a hub axis, a first one of the flap-side fastening locations being closer to the hub axis than a further one of the flap-side fastening locations; and at least one of the two airbag flaps being a radially pivotable airbag flap, the at least two links for the radially pivotable airbag flap having respective link lengths, respective hub-side fastening locations and/or respective flap-side fastening locations that are configured such that the radially pivotable airbag flap is substantially radially pivotable from the covering position to the release position and such that the radially pivotable airbag flap guides the steering wheel airbag into a given deployment direction.

Other features which are considered as characteristic for the invention are set forth in the appended claims.

Although the invention is illustrated and described herein as embodied in an occupant protection device having a steering wheel airbag for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
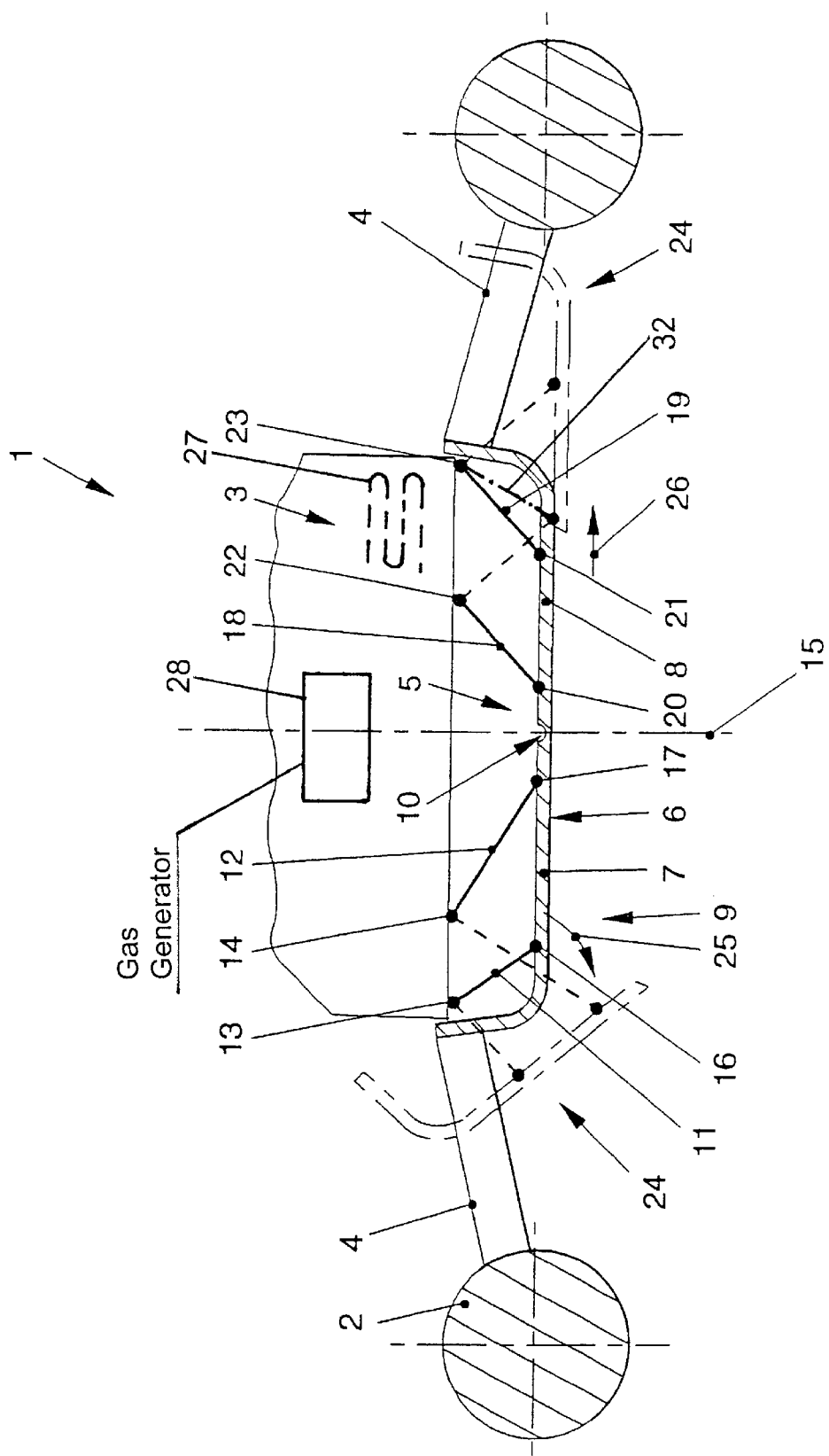
FIG. 1 is a diagrammatic, cross-sectional view of an occupant protection device according to the invention on a steering wheel, the occupant protection device having a steering wheel airbag for a motor vehicle and having airbag flaps held by connecting straps.

Referring now to the figures of the drawings in detail and first, particularly, to FIG. 1 thereof, there is shown a schematically illustrated cross section through a steering wheel 1 of a motor vehicle having an occupant protection device integrated therein. The steering wheel 1 is assembled from a steering wheel rim 2 and a steering wheel hub 3 provided centrally in the steering wheel rim 2. The steering wheel rim and the hub are connected to each other via steering wheel spokes 4.

An airbag module includes a steering wheel airbag 27, which is folded up in a normal state as is schematically indicated with a dashed line in FIG. 1, and an associated gas generator 28, which is provided in the hub region of the steering wheel 1. Furthermore, an airbag outlet opening 5 for the airbag deploying in the event of a crash is formed in the hub region of the steering wheel 1. In the normal state, when the airbag is not activated, this airbag outlet opening S is closed with a cover 6.

Figures 3, 4:
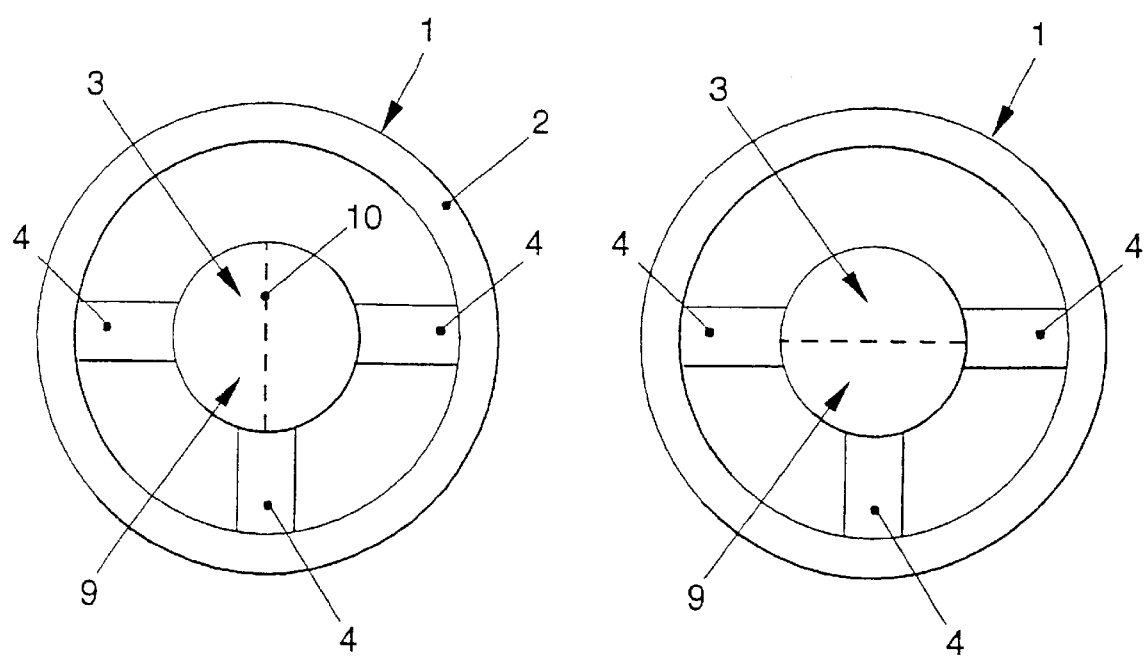
FIG. 3 is a diagrammatic plan view of a steering wheel in a centered steering wheel position with a vertically extending tear-open notch.
FIG. 4 is a diagrammatic plan view of a steering wheel in a centered steering wheel position with a horizontally extending tear-open notch.

As can be seen from FIG. 3, which shows a plan view of the steering wheel according to FIG. 1, the cover 6 is formed by two semicircular airbag flaps 7, 8 which are connected, when in the covering position illustrated in FIG. 3, at a preformed, grooved tear-open notch 10 to form a circular cover for the hub region. The preformed notch 10 acts as a securing structure 10 which holds the airbag flaps in place. The securing structure can not only be a preformed notch, but may be a form-fitting structure and/or a clamping structure.

As can furthermore be seen from FIG. 3, the tear-open notch or groove 10 runs along a diameter line of the circular cover 6, wherein the tear-open notch 10 extends vertically when the steering wheel is in a centered (normal) position, i.e. the steering wheel is not turned. In an alternative embodiment, the tear-open notch can be disposed horizontally when the steering wheel is in a centered position, i.e. the steering wheel is not turned, as is shown in FIG. 4.

As can furthermore be seen in FIG. 1, the first, semicircular airbag flap 7 is connected to the peripheral region of the airbag outlet opening 5 by two connecting straps 11, 12 which are spaced apart from one another and which have different lengths. In the covering position 9, which is illustrated in FIG. 1, the fastening locations 16, 17 of the connecting straps 11, 12 on the airbag flap 7 are positioned closer to the hub axis 15 than the fastening locations 13, 14 on the airbag outlet opening 5.

It can also be gathered from FIG. 1 that the airbag flap 8 is connected to the edge region of the airbag outlet opening 5 by two connecting straps 18, 19 which are spaced apart from one another and which have identical lengths. The fastening locations 20, 21 of the connecting straps 18, 19 on the airbag flap 8 are closer to the hub axis 15 than the fastening locations 22, 23 on the airbag outlet opening 5 and form a parallelogram-type configuration with the connecting straps 18, 19.

In the event of a crash, the deploying airbag 27 exerts a pressure on the cover 6, as a result of which the latter tears open along its tear-open notch 10 and the airbag flaps 7, 8 are transferred into their release position 24, which is shown by dashed lines in FIG. 1.

The effect achieved by the positioning and dimensioning of the connecting straps 11, 12 and 18, 19 of the airbag flaps 7, 8, respectively, as illustrated in FIG. 1, is that the airbag flap 7 is pivoted approximately radially during the transfer into the release position 24, as is illustrated by the arrow 25. In contrast, the airbag flap 8 is displaced essentially linearly during the transfer into the release position 24, as is illustrated by the arrow 26 in FIG. 1.

Figure 2:
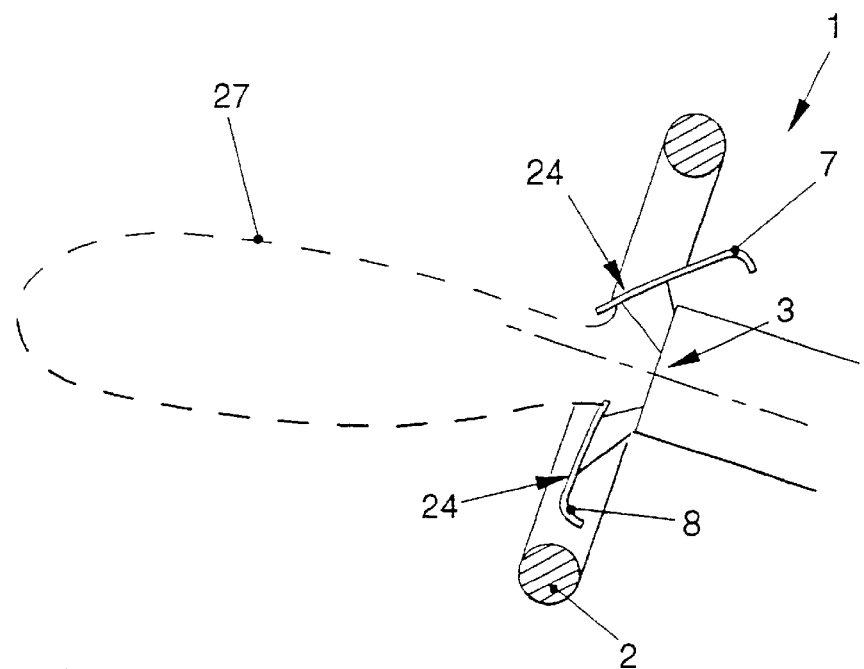
FIG. 2 is a diagrammatic, cross-sectional view of an occupant protection device according to the invention on a steering wheel, the airbag having a specific outlet direction determined by the airbag flaps.

In the release position 24 of the airbag flaps 7, 8, in which the connecting straps 11, 12 and 18, 19 are tensioned by the inflating airbag 27, a guidance of the deploying airbag 27 with a targeted outlet direction toward the driver's chest is obtained, as is schematically illustrated in FIG. 2. In order to achieve a rapid opening of the airbag flap, the opening process, which is initiated by the airbag 27, can be assisted by a spring force that is provided by a resilient structure, for example a spring 32, which is schematically indicated as a dash-dotted line in FIG. 1.

We claim:

1. An occupant protection device for a motor vehicle, comprising:
    an airbag configuration including at least one steering wheel airbag and at least one gas generator assigned to said at least one steering wheel airbag, said at least one steering wheel airbag being folded up when in a normal state and unfolding when in a deploying state, said airbag configuration defining a steering wheel hub region and a hub axis and being formed with an airbag outlet opening in the steering wheel hub region, said airbag outlet opening having a peripheral region;
    a cover including two airbag flaps for covering said airbag outlet opening, said two airbag flaps being substantially rigid and being held in place when in a covering position, said two airbag flaps being movable from the covering position to a release position for uncovering said airbag outlet opening and for letting out said at least one steering wheel airbag;
    at least two links assigned to each one of said two airbag flaps, said at least two links being selected from the group consisting of connecting straps and pivoting levers, said at least two links having respective flap-side fastening locations and respective hub-side fastening locations, said flap-side fastening locations being disposed at a respective one of said two airbag flaps, said hub-side fastening locations being disposed at said peripheral region of said airbag outlet opening, a first one of said flap-side fastening locations being closer to the hub axis than a further one of said flap-side fastening locations; and
    at least one of said two airbag flaps being a radially pivotable airbag flap, said at least two links for said radially pivotable airbag flap having respective structural properties selected from the group consisting of respective link lengths, respective hub-side fastening locations and respective flap-side fastening locations configured such that said radially pivotable airbag flap is substantially radially pivotable from the covering position to the release position and such that said radially pivotable airbag flap guides said at least one steering wheel airbag into a given deployment direction.

2. The occupant protection device according to claim 1, wherein:
    one of said two airbag flaps is said radially pivotable airbag flap, a further one of said two airbag flaps is a linearly displaceable airbag flap; and
    said at least two links for said linearly displaceable airbag flap have structural properties selected from the group consisting of respective link lengths, respective hub-side fastening locations and respective flap-side fastening locations configured such that said linearly displaceable airbag flap is substantially linearly displaceable from the covering position to the release position and such that said linearly displaceable airbag flap is disposed in a plane substantially perpendicular to the hub axis and guides said at least one steering wheel airbag into a given deployment direction.

3. The occupant protection device according to claim 1, wherein both of said two airbag flaps are radially pivotable airbag flaps having substantially identical kinematic properties and being substantially radially pivotable from the covering position to the release position.

4. The occupant protection device according to claim 1, wherein each of said flap-side fastening locations of said at least two links is disposed closer to the hub axis than a corresponding one of said hub-side fastening locations of said at least two links.

5. The occupant protection device according to claim 1, wherein at least one of said two airbag flaps is held in place with a securing structure selected from the group consisting of a form-locking structure, a clamping structure and a preformed notch configured to be torn open when said at least one steering wheel airbag unfolds.

6. The occupant protection device according to claim 1, including a resilient structure operatively connected to at least one of said two airbag flaps, said resilient structure providing a spring force for assisting said at least one steering wheel airbag to move said at least one of said two airbag flaps from the covering position to the release position.

7. The occupant protection device according to claim 1, wherein:
    said cover is a circular cover formed with a preformed notch configured to be torn open when said at least one steering wheel airbag unfolds, said preformed notch extending along a diameter line across said circular cover; and said two airbag flaps are two semicircular airbag flaps connected via said preformed notch when in the covering position.

8. The occupant protection device according to claim 1, wherein said at least two links include at least three connecting straps for securing a respective one of said two airbag flaps in the release position.

9. The occupant protection device according to claim 1, wherein said airbag configuration is an airbag module.

10. The occupant protection device according to claim 9, wherein:
    said airbag module has a given peripheral region as the peripheral region of said airbag outlet opening; and said hub-side fastening locations of said at least two links are located in said given peripheral region of said airbag module.

11. In combination with a steering wheel having a hub region, an occupant protection device for a motor vehicle, comprising:
    an airbag configuration including a steering wheel airbag and a gas generator assigned to said steering wheel airbag, said steering wheel airbag being folded up when in a normal state and unfolding when in a deploying state, said airbag configuration being formed with an airbag outlet opening in the hub region, said airbag outlet opening having a peripheral region;
    a cover including two airbag flaps for covering said airbag outlet opening, said two airbag flaps being substantially rigid and being held in place when in a covering position, said two airbag flaps being movable from the covering position to a release position for uncovering said airbag outlet opening and for letting out said steering wheel airbag;
    at least two links assigned to each one of said two airbag flaps, said at least two links being selected from the group consisting of connecting straps and pivoting levers, said at least two links having respective flap-side fastening locations and respective hub-side fastening locations, said flap-side fastening locations being disposed at a respective one of said two airbag flaps, said hub-side fastening locations being disposed at said peripheral region of said airbag outlet opening, the hub region defining a hub axis, a first one of said flap-side fastening locations being closer to the hub axis than a further one of said flap-side fastening locations; and
    at least one of said two airbag flaps being a radially pivotable airbag flap, said at least two links for said radially pivotable airbag flap having respective structural properties selected from the group consisting of respective link lengths, respective hub-side fastening locations and respective flap-side fastening locations configured such that said radially pivotable airbag flap is substantially radially pivotable from the covering position to the release position and such that said radially pivotable airbag flap guides said steering wheel airbag into a given deployment direction.

12. The occupant protection device according to claim 11, wherein at least one of said two airbag flaps is held in place with a securing structure selected from the group consisting of a form-locking structure, a clamping structure and a preformed notch configured to be torn open when said steering wheel airbag unfolds.

13. The occupant protection device according to claim 11, wherein:
    said cover is a circular cover formed with a preformed notch configured to be torn open when said at least one steering wheel airbag unfolds, said preformed notch extending along a diameter line across said circular cover; and
    said two airbag flaps are two semicircular airbag flaps connected via said preformed notch when in the covering position.

14. The occupant protection device according to claim 13, wherein the steering wheel has a centered position when not being turned, and said preformed notch extends vertically across said circular cover when the steering wheel is in the centered position.

15. The occupant protection device according to claim 13, wherein the steering wheel has a centered position when not being turned, and said preformed notch extends horizontally across said circular cover when the steering wheel is in the centered position.

\* \* \* \* \*